US012147178B2

(12) United States Patent
Yokoyama

(10) Patent No.: US 12,147,178 B2
(45) Date of Patent: *Nov. 19, 2024

(54) HEATING DEVICE AND IMAGE PROCESSING APPARATUS

(71) Applicant: Toshiba Tec Kabushiki Kaisha, Tokyo (JP)

(72) Inventor: Shuji Yokoyama, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 20 days.

This patent is subject to a terminal disclaimer.

(21) Appl. No.: 18/153,664

(22) Filed: Jan. 12, 2023

(65) Prior Publication Data

US 2023/0168616 A1 Jun. 1, 2023

Related U.S. Application Data

(63) Continuation of application No. 17/319,440, filed on May 13, 2021, now Pat. No. 11,579,549.

(30) Foreign Application Priority Data

Aug. 19, 2020 (JP) ................................ 2020-138572

(51) Int. Cl.
*G03G 15/20* (2006.01)

(52) U.S. Cl.
CPC ................................ *G03G 15/2053* (2013.01)

(58) Field of Classification Search
CPC ........... G03G 15/2017; G03G 15/2053; G03G 2215/2003
See application file for complete search history.

(56) References Cited

U.S. PATENT DOCUMENTS

| | | | | |
|---|---|---|---|---|
| 10,915,044 | B2 | 2/2021 | Yokoyama | |
| 11,579,549 | B2 * | 2/2023 | Yokoyama | G03G 15/2053 |
| 2003/0183610 | A1 | 10/2003 | Okabayashi | |
| 2008/0124147 | A1 | 5/2008 | Uehara | |
| 2009/0317155 | A1 | 12/2009 | Murakami | |
| 2010/0247183 | A1 | 9/2010 | Haseba | |
| 2010/0247184 | A1 | 9/2010 | Iwai | |
| 2012/0321333 | A1 | 12/2012 | Baba | |

(Continued)

FOREIGN PATENT DOCUMENTS

| | | | |
|---|---|---|---|
| EP | 3171227 | A1 | 5/2017 |
| EP | 3693801 | A1 | 8/2020 |
| JP | 2010079122 | A | 4/2010 |

(Continued)

OTHER PUBLICATIONS

JP 2019101364 English machine translation, Kanehiro, Jun. 24, 2019 (Year: 2019).*

(Continued)

*Primary Examiner* — Thomas S Giampaolo, II
(74) *Attorney, Agent, or Firm* — Kim & Stewart LLP

(57) ABSTRACT

According to one embodiment, a heating device includes a cylindrical belt, a heat generating member, and a support member. The heat generating member is disposed in an interior region surrounded by the belt and in contact with an inner peripheral surface of the belt. The support member is provided in the interior region surrounded by the belt and contacts and supports the heat generating member.

20 Claims, 5 Drawing Sheets

(56) References Cited

U.S. PATENT DOCUMENTS

| | | | |
|---|---|---|---|
| 2017/0075269 | A1 | 3/2017 | Iwasaki |
| 2018/0188674 | A1 | 7/2018 | Yokoyama |

FOREIGN PATENT DOCUMENTS

| | | | |
|---|---|---|---|
| JP | 2016206477 | A | 12/2016 |
| JP | 2019101364 | A | 6/2019 |

OTHER PUBLICATIONS

Extended European Search Report dated Nov. 29, 2021, mailed in counterpart European Application No. 21183205.0, 10 pages.
Japanese Office Action dated Jan. 30, 2024, mailed in counterpart Japanese Application No. 2020-138572, 6 pages (with translation).

* cited by examiner

HEATING DEVICE AND IMAGE PROCESSING APPARATUS

CROSS-REFERENCE TO RELATED APPLICATION

This application is a continuation of U.S. patent application Ser. No. 17/319,440, filed on May 13, 2021, which is based upon and claims the benefit of priority from Japanese Patent Application No. 2020-138572, filed on Aug. 19, 2020, the entire contents of each of which are incorporated herein by reference.

FIELD

Embodiments described herein relate generally to a heating device and an image processing apparatus incorporating a heating device.

BACKGROUND

An image processing apparatus of a known type includes a heating device that fixes toner to a sheet by heat from a rotating belt. The heating device may heat the belt by electromagnetic induction. Such a heating device may also include a heat generating member to contact the inner peripheral surface of the belt to make up for any lack of heat generation by the belt alone. The heat generating member functions to concentrate magnetic flux during electromagnetic induction heating to increase the amount of heat generated.

The heating device may also include a shielding member connected to the heat generating member to block magnetic flux during electromagnetic induction heating. The heating device may also include a support member that supports the shielding member. When the support member is also used to support the heat generating member via connection to the shielding member, the dimensions of the heat generating member with respect to a supporting position requires incorporation of a tolerance amount accounting for the possible variations in two different members (the shielding member and the heat generating member). When a tolerance for two members is required to be provided, it may not be possible to improve the dimensional accuracy of the heat generating member.

DETAILED DESCRIPTION

According to one embodiment, the heating device includes a cylindrical belt, a heat generating member, and a support member. The heat generating member is disposed within an interior region that is surrounded by the cylindrical belt. The heat generating member contacts an inner peripheral surface of the belt. The support member is disposed in the interior region contacts and supports the heat generating member.

Hereinafter, some example embodiments will be described with reference to the accompanying drawings.

First Embodiment

Figure 1:
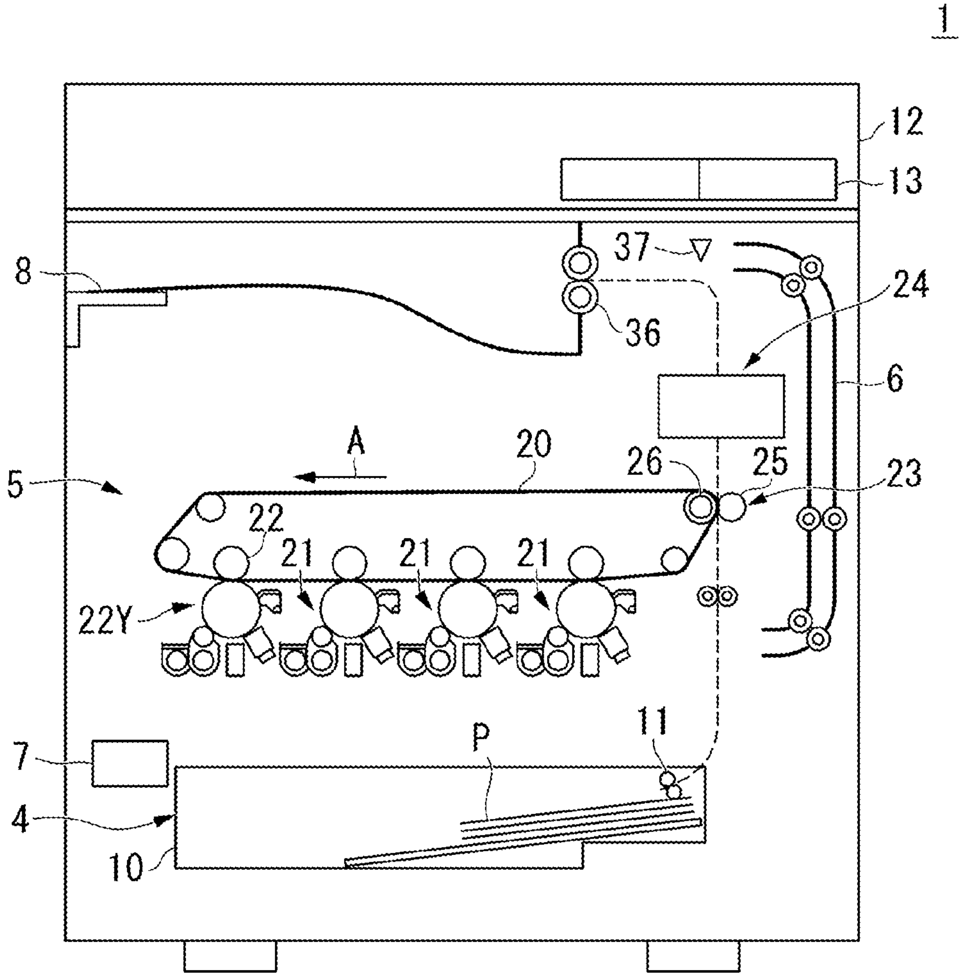
FIG. 1 depicts an image processing apparatus of a first embodiment.

FIG. 1 is a schematic diagram of an image processing apparatus 1 of the first embodiment.

For example, the image processing apparatus 1 is a multifunction peripheral (MFP). The image processing apparatus 1 reads or scans an image that has been previously formed on a sheet-shaped recording medium (herein referred to as a "sheet") such as paper to generate digital data such as an image file. The image processing apparatus 1 can print an image on a sheet with toner based on the digital data.

The image processing apparatus 1 includes a display unit 13, an image reading unit 12, a sheet supply unit 4, an image forming unit 5, a sheet reversing unit 6, and a control unit 7.

The display unit 13 operates as a user interface and displays text, icons, characters, images, and the like. The display unit 13 can also operate as an input interface and receives instructions from a user, an operator, or the like. For example, the display unit 13 is a touch panel type liquid crystal display. For example, the image reading unit 12 is a color scanner. As types of a color scanner, there are a contact image sensor (CIS), a charge coupled device (CCD), and the like. The image reading unit 12 uses a sensor to read an image already formed on a sheet and generate digital data or image data therefrom.

The sheet supply unit 4 supplies a sheet P to be used by the image forming unit 5 in a printing operation. The sheet supply unit 4 includes a sheet feed cassette 10 and a pickup roller 11. The sheet feed cassette 10 stores the sheet P. The pickup roller 11 picks up the sheet P from the sheet feed cassette 10. The image forming unit 5 forms an image on the sheet using toner. The image forming unit 5 forms the image based on the image data generated by the image reading unit 12 or the image data received from an external device. For example, the sheet with the image formed thereon can be referred to as a hard copy, a printout, or the like.

The image forming unit 5 includes an intermediate transfer body 20, an image forming unit 21, a primary transfer roller 22, a secondary transfer unit 23, and a heating device 24. The image transfer process by the image forming unit 5 includes a first transfer step (primary transfer) and a second transfer step (secondary transfer). In the first transfer step, the primary transfer roller 22 transfers a toner image from the photoconductor drum of each image forming units 21 to the intermediate transfer body 20. For a full-color printing operation, the toner images from each image forming unit 21 may be stacked one on the other. In the second transfer step, the secondary transfer unit 23 transfers the toner image(s) from the intermediate transfer body 20 to the sheet P.

The intermediate transfer body 20 is a belt in this example. The intermediate transfer body 20 is rotating in the direction of arrow A in FIG. 1. A toner image is thus initially formed on the surface of the intermediate transfer body 20.

Each image forming unit 21 forms an image using the toner of a respective color (for example, 4 colors). In the present embodiment, a plurality of image forming units 21 are installed along the intermediate transfer body 20.

The primary transfer roller 22 of each image forming unit 21 transfers the toner image formed by the image forming unit 21 to the intermediate transfer body 20.

The secondary transfer unit 23 includes a secondary transfer roller 25 and a secondary transfer opposing roller 26. The secondary transfer unit 23 transfers the toner image formed on the intermediate transfer body 20 to the sheet P.

The heating device 24 fixes the transferred toner image to the sheet by heating and pressure. Then, the printed sheet is discharged from a sheet discharge unit 8 to the outside of the image processing apparatus 1.

The sheet reversing unit 6 includes a sheet path that passes through a space between the heating device 24 and an outer wall or panel of the image processing apparatus 1. The sheet reversing unit 6 functions to reverse front and back sides of the sheet. For example, the front to back reversing of the sheet can be performed when an image is to be formed on both the front and back surfaces of the sheet (double-sided printed).

The control unit 7 is a controller that controls the components of the image processing apparatus 1.

Figure 2:
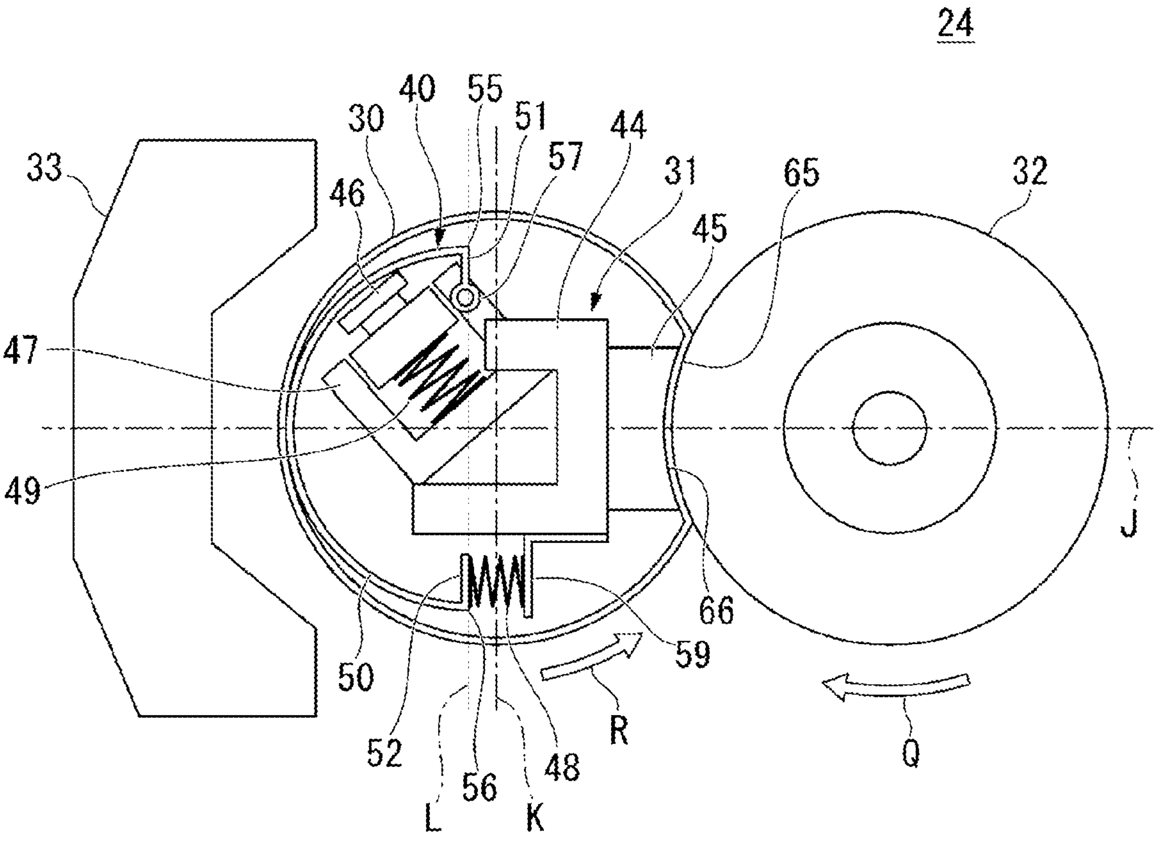
FIG. 2 depicts a heating device according to a first embodiment.
Figure 3:
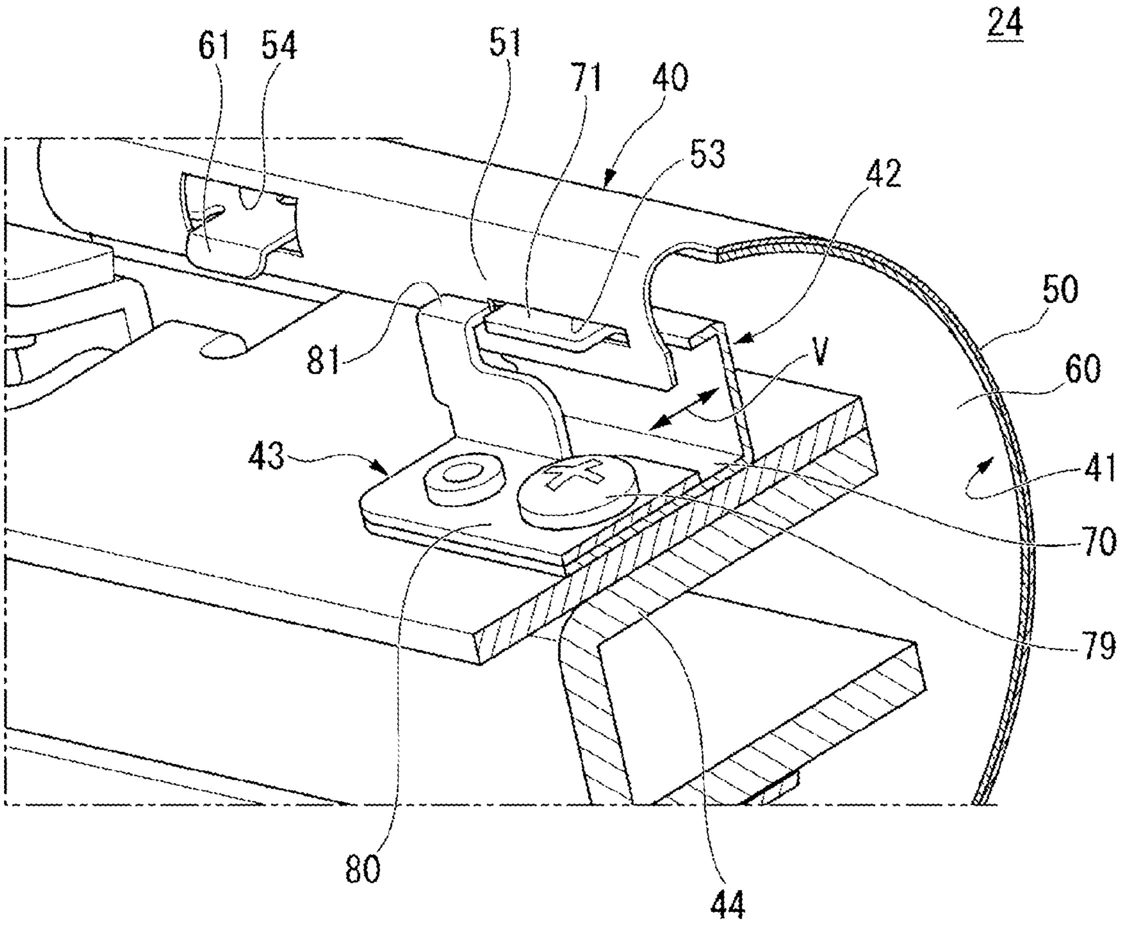
FIG. 3 depicts a support member according to a first embodiment.

FIG. 2 is a schematic diagram of the heating device 24 of the first embodiment. FIG. 3 depicts support members 42 and 43 of the first embodiment in a peripheral perspective view.

As shown in FIG. 2, the heating device 24 includes a belt 30, a belt internal mechanism 31, a press roller 32, and an inductive current generating unit 33.

The belt 30 is a generally cylindrical belt. For example, the belt 30 is formed by sequentially laminating a heat generating layer (which is a conductive layer) and a release layer on top of a base layer. The heat generating layer may be referred to as a heat generating unit in some instances. The base layer can be polyimide resin (PI), for example. The heat generating layer can be a non-magnetic metal such as copper (Cu), for example. The release layer can be formed of a fluororesin such as a tetrafluoroethylene/perfluoroalkyl vinyl ether copolymer resin (PFA), for example. The structure of the belt 30 is not limited to the present example as long as the belt includes within a heat generating layer.

The belt internal mechanism 31 is arranged inside the region surrounded by belt 30. The belt internal mechanism 31 includes a heat generating member 40, a shielding member 41 (see FIG. 3), support members 42 and 43 (see FIG. 3), a frame 44, a nip pad 45, a thermostat 46, a holder 47, a first biasing member 48, and a second biasing member 49.

The heat generating member 40 is in contact with the inner surface of the belt 30. The heat generating member 40 faces the inductive current generating unit 33 with the belt 30 interposed therebetween. The heat generating member 40 is made of a magnetic material. For example, the heat generating member 40 is formed of a magnetic alloy having a Curie point lower than that of the heat generating layer of the belt 30. For example, the heat generating member 40 is formed of a thin metal material made of a magnetic alloy such as iron or nickel alloy having a Curie point of 220° C. to 230° C. For example, rigidity of the heat generating member 40 is higher than that of the shielding member 41 (see FIG. 3).

The heat generating member 40 may be formed of a thin metal material having magnetic properties such as iron, nickel, and stainless steel. In some examples, the heat generating member 40 may be formed of a resin material containing a magnetic powder or the like, and, in general, the heat generating member 40 may be made of any material so long as the heat generating member 40 is magnetic. In some particular examples, the heat generating member 40 may be formed of a magnetic material such as a ferrite.

The heat generating member 40 has a length in an axial direction of the belt 30, that is an axial direction of the belt 30 (referred to as a "belt axial direction"). The heat generating member 40 is curved along the inner peripheral surface of the belt 30. The heat generating member 40 includes a curved portion 50, a first bent portion 51, and a second bent portion 52. The curved portion 50, the first bent portion 51, and the second bent portion 52 are integrally formed of the same material in this example.

The curved portion 50 is formed in an arc shape along the inner peripheral surface of the belt 30. The curved portion 50 is in contact with the inner peripheral surface of the belt 30. The radius of curvature of the curved portion 50 is smaller than that of the belt 30.

An outer peripheral surface of the curved portion 50 may be plated or coated with chromium nitride, diamond-like carbon (DLC), or the like. By plating or coating with chromium nitride, DLC, or the like, slidability between the curved portion 50 and the belt 30 is improved (that is, friction is reduced).

The first bent portion 51 is bent inward from a first end portion 55 in the circumferential direction of the curved portion 50. A plurality of first bent portions 51 (for example, two in the present embodiment) are provided in the belt axial direction. The first bent portion 51 is directly supported by the support members 42 and 43 (see FIG. 3). The first bent portion 51 includes an annular portion 57. The annular portion 57 is supported by a swing shaft along the belt axis direction. The heat generating member 40 can swing around the swing shaft.

The second bent portion 52 is bent inward from a second end portion 56 in the circumferential direction of the curved portion 50. A plurality of second bent portions 52 (for example, two in the present embodiment) are provided in the belt axial direction. The second bent portion 52 is connected to a first end portion of the first biasing member 48. For example, the first biasing member 48 is an elastic member such as a compression spring. A second end portion of the first biasing member 48 is connected to a stay 59. The stay 59 is fixed to the frame 44. The heat generating member 40 is pressed against the belt 30 by the first biasing member 48.

As shown in FIG. 3, the shielding member 41 is connected to the heat generating member 40. For example, the shielding member 41 is made of a non-magnetic material such as aluminum and copper. For example, the shielding member 41 is made of an aluminum material having a thickness of about 0.4 mm. The shielding member 41 shields inside of the belt 30 from the magnetic flux emitted from the inductive current generating unit 33 (see FIG. 2). This suppresses noises on a signal line routed inside the belt 30.

The shielding member 41 has a length in the belt axial direction. The shielding member 41 is formed in an arc shape along the inner peripheral surface of the curved portion 50. The shielding member 41 includes a shielding main body 60 and a connecting claw 61.

The shielding main body 60 is formed in an arc shape along the inner peripheral surface of the curved portion 50. The shielding main body 60 is in contact with the inner peripheral surface of the curved portion 50. The radius of curvature of the shielding main body 60 is substantially the same as that of the curved portion 50.

The connecting claw 61 is bent inward from both ends in the circumferential direction of the shielding main body 60. A plurality of such connecting claws 61 (for example, two in this embodiment) can be provided at intervals in the longitudinal direction (that is, the belt axial direction) of the shielding main body 60. Each connecting claw 61 can be attached to a corresponding connection hole 54 of the first bent portion 51 and the second bent portion 52. FIG. 3 shows just one of the connection holes 54 provided in the first bent portion 51.

As shown in FIG. 2, the nip pad 45 presses the belt 30 against the press roller 32. The nip pad 45 is fixed to the frame 44. The nip pad 45 forms a nip 65 between the belt 30 and the press roller 32. The nip pad 45 has a nip forming surface 66 facing the nip 65 direction. The nip forming surface 66 is curved toward the inside of the belt 30 when viewed from the belt axial direction. The nip forming surface 66 is curved along an outer peripheral surface of the press roller 32 when viewed from the belt axial direction.

For example, the nip pad 45 is formed of an elastic material such as silicone rubber and fluoro rubber. The nip pad 45 may be formed of a heat-resistant resin such as a polyimide resin (PI), a polyphenylene sulfide resin (PPS), a polyether sulfone resin (PES), a liquid crystal polymer (LCP), or a phenol resin (PF).

In one example, a friction reducing member may be placed between the belt 30 and the nip pad 45. For example, the friction reducing member is formed of a sheet material providing good slidability (low friction) and excellent wear resistance, a release layer, or the like. The friction reducing member can be supported by or affixed to the belt internal mechanism 31. The friction reducing member is in sliding contact with the traveling inner peripheral surface of the belt 30. The friction reducing member may be formed of a lubricated sheet member or other material providing lubricity or reduced friction. For example, the sheet member may be made of a glass fiber sheet impregnated with a fluororesin. For example, the friction reducing member may incorporate a lubricating oil such as silicone oil.

The thermostat 46 functions as a safety device for the heating device 24. The thermostat 46 detects a temperature of the heat generating member 40. The thermostat 46 operates when the heat generating member 40 abnormally generates heat and the temperature rises to a cutoff threshold value. The thermostat 46 cuts off a current to the inductive current generating unit 33. By interrupting the current to the inductive current generating unit 33, it is possible to prevent the heating device 24 from generating abnormal heat.

The thermostat 46 is connected to a first end portion of the second biasing member 49. For example, the second biasing member 49 is an elastic member such as a compression spring. A second end portion of the second biasing member 49 is connected to the holder 47. The holder 47 is fixed to the frame 44. The thermostat 46 is pressed against the heat generating member 40 by the second biasing member 49. The thermostat 46 follows the swing movement of the heat generating member 40 due to the pressing of the second biasing member 49. By following the swing movement of the heat generating member 40, the thermostat 46 can always be in contact with the heat generating member 40. For example, a portion of the shielding member 41 (see FIG. 3) facing the thermostat 46 may be left open. The thermostat 46 is not limited to being in direct contact with the heat generating member 40 through an opening in the shielding member 41. The thermostat 46 may be, for example, in contact with the heat generating member 40 via the shielding member 41 rather than via an opening in the shielding member 41.

The press roller 32 presses the belt 30 with a pressing mechanism. For example, the press roller 32 is provided with a heat-resistant silicone sponge or foam material, a silicon rubber layer, and the like around a core metal. For example, a release layer is on a surface of the press roller 32. The release layer can be formed of a fluororesin such as PFA resin.

The belt 30 and the press roller 32 are driven by a drive unit such as a motor. The press roller 32 is driven by a motor to rotate in the direction of arrow Q. When the belt 30 and the press roller 32 come into contact with each other, the belt 30 follows the rotation of the press roller 32 and rotates in the direction of arrow R. When the belt 30 and the press roller 32 are separated from each other, the belt 30 may be separately driven by a motor to rotate in the direction of arrow R.

When viewed from the belt axis direction, a straight line that would pass through the center of rotation for the belt 30 and the center of rotation for the press roller 32 is defined as a first straight line J (see FIG. 2). Another straight line that is orthogonal to the first straight line J and would pass through the center of rotation of the belt 30 when viewed from the belt axis direction is defined as a second straight line K (see FIG. 2). When viewed from the belt axis direction, the heat generating member 40 is positioned closer to the second straight line K than is the inductive current generating unit 33.

The inductive current generating unit 33 is arranged on the outside of the belt 30 (that is, not within the region surrounded by the belt 30). The inductive current generating unit 33 faces a portion of the outer surface of the belt 30. The inductive current generating unit 33 faces the heat generating member 40 across the belt 30. The inductive current generating unit 33 includes a coil, for example. In such a case, a high-frequency current is applied to the coil from an inverter drive circuit. The high-frequency current flowing through the coil causes a high-frequency magnetic field to be generated around the coil. The belt 30 is then heated by interaction with the magnetic flux of the high-frequency magnetic field.

Due to the magnetic flux generated by the coil, a magnetic flux is generated between the heat generating member 40 and the belt 30. The belt 30 is heated by the magnetic flux. When its Curie point is exceeded, the heat generating member 40 changes from ferromagnetic to paramagnetic. Thus, once the heat generating member 40 has exceeded the Curie point, the magnetic path between the heat generating member 40 and the heat generating layer is no longer formed, and the heating of the belt 30 is no longer assisted. By forming the heat generating member 40 with a magnetic alloy, it is possible to avoid an excessive temperature rise of the belt 30 at a high temperature while still assisting the temperature increase of the belt 30 from a lower temperature with the Curie point temperature as the boundary temperature.

Figure 4:
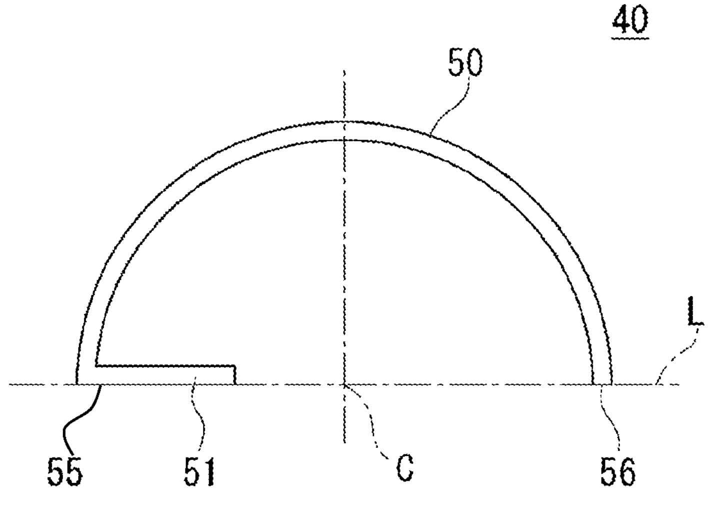
FIG. 4 depicts a heat generating member according to a first embodiment.

FIG. 4 is a schematic diagram of a part of the heat generating member 40 of the first embodiment. As shown in FIG. 4, the heat generating member 40 has the arc-shaped curved portion 50 when viewed from the belt axial direction. The heat generating member 40 has the first bent portion 51 that is bent inward in the radial direction from the first end portion 55 in the circumferential direction of the curved portion 50. The first bent portion 51 has a linear shape extending radially inward from the first end portion 55. When viewed from the belt axis direction, an arc center C of the curved portion 50 is arranged on the same plane as a surface of the first bent portion 51. This surface of the first bent portion 51 extends from the outer peripheral surface of the curved portion 50 and is opposite to another surface of the first bent portion 51 facing the inner peripheral surface of the curved portion 50. That is, the surface of the first bent portion 51 which is on the same plane as the arc center C of the curved portion 50 does not face the inner peripheral surface of the curved portion 50.

The second end portion 56 in the circumferential direction of the curved portion 50 is arranged on the same plane as the surface of the first bent portion 51. In the present embodiment, the second end portion 56 in the circumferential direction of the curved portion 50 is the end portion opposite to the side (that is the first end portion 55 side) in the circumferential direction of the curved portion 50 where the first bent portion 51 is provided, between the end portions 55 and 56. The second end portion 56 in the circumferential direction of the curved portion 50 does not have the first bent portion 51.

A virtual straight line passing through the arc center C of the curved portion 50, the surface of the first bent portion 51, and the second end portion 56 in the circumferential direction of the curved portion 50 when viewed from the belt axis direction is defined as a third straight line L. As shown in FIG. 2, the third straight line L is parallel to the second straight line K when viewed from the belt axis direction. The third straight line L is closer to the inductive current generating unit 33 than the second straight line K when viewed from the belt axis direction.

As shown in FIG. 3, the support members 42 and 43 directly support the first bent portion 51 of the heat generating member 40. The support members 42 and 43 do not directly support the shielding member 41. The support members 42 and 43 come into contact with the heat generating member 40. The support members 42 and 43 do not come into contact with the shielding member 41. For example, the support members 42 and 43 may be formed of a stainless-steel material (SUS) having a thickness of about 0.5 mm. It may be preferable that the portions of the support members 42 and 43 that come into contact with the heat generating member 40 are treated or processed so as not to have burrs or the like.

In the present embodiment, a plurality of support members is provided. That is, in the present example, two support members 42 and 43 are provided for a first bent portion 51 as shown in FIG. 3. The first bent portion 51 includes a through hole 53 into which the support member 42 can be inserted. The through hole 53 opens in a swing direction V of the heat generating member 40. The through hole 53 has a rectangular shape having a length in the belt axial direction. The two support members 42 and 43 are also referred to as a first support member 42 and a second support member 43, respectively.

The first support member 42 is inserted into the through hole 53 of the first bent portion 51. The first support member 42 includes a first support main body 70 and a first support tip 71.

The first support main body 70 has an L-shaped cross section when viewed from the belt axial direction. The first support main body 70 is fixed to the frame 44 by a fastening member 79 such as a bolt.

The first support tip 71 extends from a portion of the first support main body 70 opposite to the frame 44 and is inserted into and projects through the through hole 53 of the first bent portion 51.

The second support member 43 faces a protruding portion of the first support tip 71, that is a portion of the first support member 42 that protrudes from the through hole 53 of the first bent portion 51. The second support member 43 includes a second support main body 80 and a second support tip 81.

The second support main body 80 has an L shape smaller than that of the first support main body 70 when viewed from the belt axial direction. The second support main body 80 is fixed to the frame 44 together with the first support main body 70 by the fastening member 79. That is, the first support main body 70 and the second support main body 80 are fixed by the common fastening member 79.

The second support tip 81 extends from a portion of the second support main body 80 opposite to the frame 44 toward the first bent portion 51. The second support tip 81 faces a portion adjacent to the through hole 53 in the belt axial direction in the first bent portion 51. The second support tip 81 is not inserted into the through hole 53 of the first bent portion 51. The second support tip 81 is arranged inside the first support tip 71 in the belt axial direction.

Figure 5:
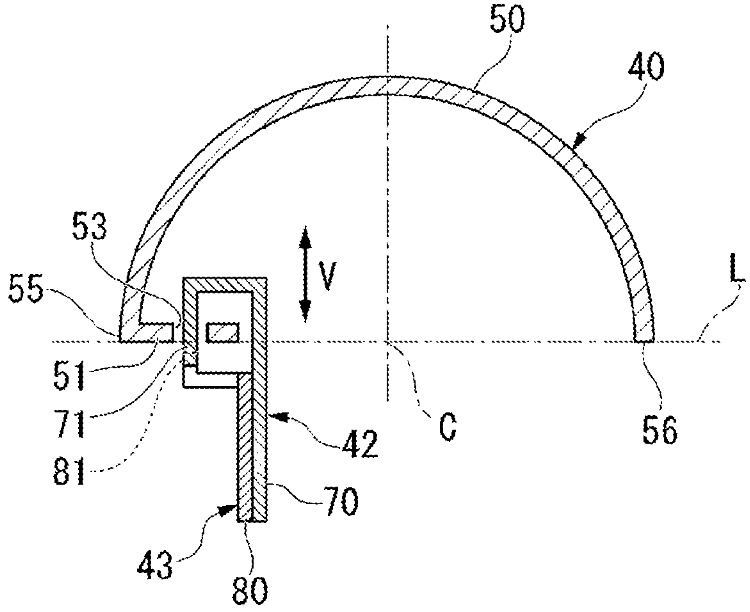
FIG. 5 depicts a support member in a cross-sectional view according to a first embodiment.

FIG. 5 shows the support members 42 and 43 of the first embodiment in a cross-sectional view at a plane orthogonal to the belt axial direction where the first support tip 71 of the first support member 42 protrudes from the through hole 53 of the first bent portion 51.

As shown in FIG. 5, the first support tip 71 is arranged on the same plane as the second support tip 81. A surface of the first support tip 71 in the thickness direction is arranged on the same plane as that of the second support tip 81. The first support tip 71 overlaps with the second support tip 81 when viewed from the belt axial direction. The first support tip 71 has the same thickness as the second support 81.

For example, the distance between the first support main body 70 and the first bent portion 51 in the swing direction V is equal to or greater than a predetermined or preset maximum swing amount of the heat generating member 40. Further, for example, the length of the first support tip 71 in the direction extending from the first support main body 70 is equal to or greater than the predetermined maximum swing amount of the heat generating member 40. Further, for example, the distance between the second support main body 80 and the first bent portion 51 in the swing direction V is equal to or greater than the predetermined maximum swing amount of the heat generating member 40. Still further, for example, the distance between the second support tip 81 and the first bent portion 51 in the swing direction V is equal to or greater than the predetermined maximum swing amount of the heat generating member 40.

In the present embodiment, the heating device 24 includes the belt 30, the heat generating member 40, and support members 42 and 43. The belt 30 has a tubular shape. The heat generating member 40 is provided inside the region surrounded by the belt 30. The heat generating member 40 is in contact with the inner peripheral surface of the belt 30. The support members 42 and 43 come into contact with and directly support the heat generating member 40. With this configuration according to the present embodiment, in contrast to a case where the support members 42 and 43 indirectly support the heat generating member 40, the dimensions of the heat generating member 40 with respect to its support position do not have to include or otherwise account for the tolerance margins across a plurality of different members. That is, it is sufficient to provide only the manufacturing tolerance requirements of the heat generating member 40 itself. Therefore, the dimensional accuracy of the heat generating member 40 can be improved.

The heating device 24 is also provided inside the region surrounded by belt 30 and further includes the shielding member 41 that is connected to the heat generating member 40. The heat generating member 40 is made of a magnetic material. The shielding member 41 is made of a non-magnetic material. The support members 42 and 43 do not support the shielding member 41. With this configuration, in contrast with a case where the support members 42 and 43 support the heat generating member 40 via the shielding member 41, the dimensions of the heat generating member 40 with respect to its support position do not include the tolerances margins spanning the two members, that is, the shielding member 41 and the heat generating member 40. That is, it is sufficient to include only the tolerance for the heat generating member 40. Therefore, the dimensional accuracy of the heat generating member 40 can be further improved. In addition, the shielding member 41 can prevent the magnetic flux generated during electromagnetic induction heating from reaching the interior of the belt 30. This suppresses noises on any signal line that might be routed inside the region surrounded by belt 30, for example.

The heat generating member 40 includes the curved portion 50 and first bent portion 51 in the present embodiment. The curved portion 50 is formed in an arc shape along the inner peripheral surface of the belt 30 and is in contact with the inner peripheral surface of the belt 30. The first bent portion 51 is bent from the first end portion 55 in the circumferential direction of the curved portion 50 and is directly supported by the support members 42 and 43. With this configuration, due to the bending of the curved portion 50 from the first end portion 55 in the circumferential direction, the first bent portion 51 has high rigidity in the heat generating member 40. By directly supporting the high-rigidity first bent portion 51 with the support members 42 and 43, it is possible to prevent the first bent portion 51 from being accidentally deformed during, for example, assembly or maintenance of the heating device 24.

The arc center C of the curved portion 50 is on the same plane as the surface of the first bent portion 51 in the present embodiment. With this configuration, the arc center C of the curved portion 50 and the surface of the first bent portion 51 can be used as positioning references, and it is easier to control the dimensions of the heat generating member 40.

The second end portion 56 in the circumferential direction of the curved portion 50 is on the same plane as the surface of the first bent portion 51 in the present embodiment. With this configuration, the second end portion 56 in the circumferential direction of the curved portion 50 can be used as a positioning reference in addition to the arc center C of the curved portion 50 and the surface of the first bent portion 51, and the dimension control of the heat generating member 40 becomes further easier. For example, since the arc center C of the curved portion 50, the surface of the first bent portion 51, and the second end portion 56 in the circumferential direction of the curved portion 50 can be stably arranged on the surface plate, a positioning jig or the like for positioning at the time of the dimension control of the heat generating member 40 becomes unnecessary.

The first bent portion 51 has the through hole 53 into which the first support member 42 can be inserted in the present embodiment. With this configuration, by inserting the first support member 42 into the through hole 53 of the first bent portion 51, the first bent portion 51 can be more easily and directly supported.

The heat generating member 40 is swingable, and the through hole 53 opens in the swing direction V of the heat generating member 40 in the present embodiment. With this configuration, the support members 42 and 43 do not interfere with the swing of the heat generating member 40, and the heat generating member 40 can be swung smoothly.

A plurality of support members are provided in an example. The plurality of support members include a first support member 42 and a second support member 43. The first support member 42 can be inserted into the through hole 53 of the first bent portion 51. The second support member 43 faces the portion of the first support member 42 where the through hole 53 of the first bent portion 51 protrudes. With this configuration, the second support member 43 can prevent the first support member 42 from falling off due to the swing of the heat generating member 40.

The first support tip 71 is on the same plane as the second support tip 81 in the present embodiment. With this configuration, the first support tip 71 and the second support tip 81 do not interfere with the swing of the heat generating member 40, and the heat generating member 40 can be swung further smoothly.

The image processing apparatus 1 includes the heating device 24 according to the present embodiment. The heating device 24 can improve the dimensional accuracy of the heat generating member 40. Therefore, the image processing apparatus 1 can improve the image quality.

Figure 6:
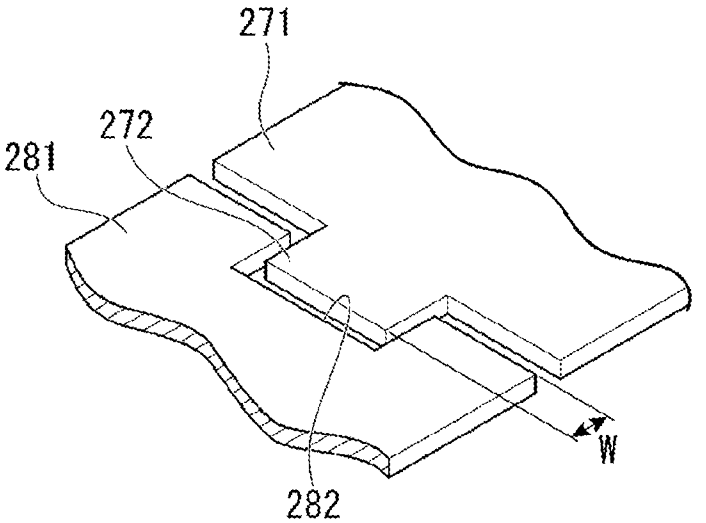
FIG. 6 depicts a support tip according to a second embodiment.

Next, a second embodiment will be described with reference to FIG. 6. FIG. 6 depicts first and second support tips 271 and 281 in a perspective view according to the second embodiment. With regard to the second embodiment, further description of the same or substantially the same aspects as those of the first embodiment is omitted.

In general, the second embodiment is different from the first embodiment in that a second support tip is arranged on both sides of a first support tip in the belt axial direction rather than to the inside of the first support tip in the belt axial direction.

FIG. 6 depicts support tips (271 and 281) of the second embodiment.

As shown in FIG. 6, the first support tip 271 has a convex portion 272 protruding towards the second support tip 281. The second support tip 281 has a corresponding concave shape that matches the convex portion 272 of the first support tip 271 to sandwich the convex portion 272 from both sides in the belt axial direction. In particular, the second support tip 281 has a recess 282 corresponding in position to the convex portion 272. The convex portion 272 overlaps with the second support tip 281 when viewed from the belt axial direction. In FIG. 6, reference numeral W indicates an overlapping portion of the convex portion 272 of the first support tip 271 and the second support tip 281.

With this overlap, the first support tip 271 and the second support tip 281 do not interfere with the swing of the heat generating member 40, and the heat generating member 40 can be swung smoothly.

Figure 7:
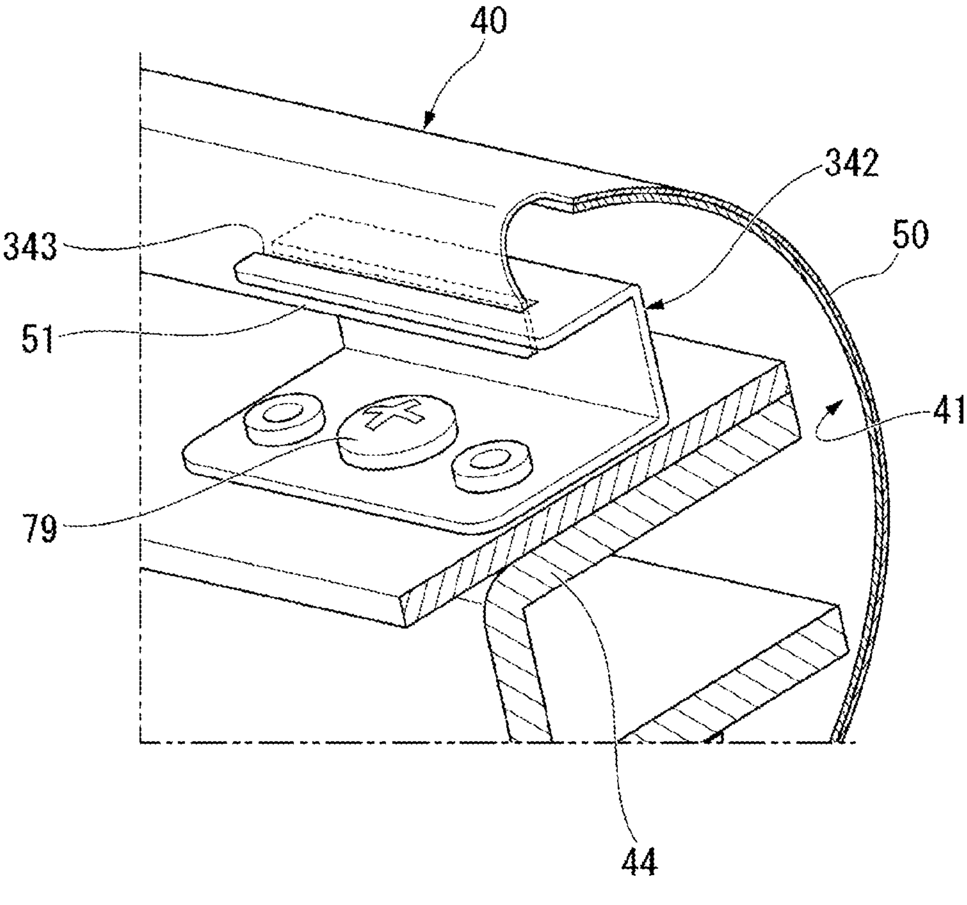
FIG. 7 depicts a support member according to a third embodiment.

Next, a third embodiment will be described with reference to FIG. 7. FIG. 7 depicts a support member 342 in a peripheral perspective view according to the third embodiment. For the third embodiment, additional description of aspects which are the same or substantially the same as those of the first embodiment will be omitted.

In the first embodiment, the two support members 42 and 43 are provided. In the third embodiment, a single support member 342 is provided.

As shown in FIG. 7, the heat generating member 40 is directly supported by the support member 342.

The support member 342 includes a slit 343 that is open so that the first bent portion 51 of the heat generating member 40 can be inserted therein. The slit 343 opens inside the support member 342 in the belt axial direction. The slit 343 has a length in the belt axial direction. The slit 343 has a width greater than the thickness of the first bent portion 51. The first bent portion 51 does not have the through hole 53.

According to the third embodiment where only one support member 342 is provided, the number of parts, and hence the manufacturing cost, can be further reduced, compared with the case where two or more support members are provided.

Modified Embodiments

While the heating device 24 of some example embodiments includes the shielding member 41 connected to the heat generating member 40, in some modified embodiments, the heating device 24 need not have a shielding member.

While the heat generating member 40 of some example embodiments includes the curved portion 50, the first bent portion 51, and the second bent portion 52, the heat generating member 40 in some modified embodiments need not have a second bent portion 52. That is, a configuration, a shape or the like of the heat generating member 40 can be appropriately modified according to required specifications.

While the arc center C of the curved portion 50 of some example embodiments is on the same plane as the surface of the bent portion 51. However, in some modified embodiments, the arc center C of the curved portion 50 may be on a plane different from the surface of the bent portion 51.

While the circumferential end portion of the curved portion 50 of the present embodiments is on the same plane as the surface of the bent portion 50, in some modified embodiments, the circumferential end portion of the curved portion 50 may be on a plane different from the surface of the bent portion 50.

The first bent portion 51 of the present embodiment has the through hole 53 through which the support member 42 can be inserted. The first bent portion 51 need not have a through hole in some modified embodiments.

The heat generating member 40 of the present embodiments is swingable. The heat generating member 40 need not be swingable in some modified embodiments.

In some embodiments, the image processing apparatus 1 may be a decoloring device. When the image processing apparatus is a decoloring device, the heating device 24 performs a process of decoloring or erasing the image formed on the sheet with a decolorable toner.

According to certain embodiments described above, in contrast to the case where a support member indirectly supports a heat generating member by contacting the heat generating member, the dimensions of the heat generating member 40 with respect to the support position do not necessarily include the tolerance requirements spanning across a plurality of members. Therefore, the dimensional accuracy of the heat generating member can be improved.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A heating device, comprising:

a cylindrical belt;

a heat generating member disposed within an interior region surrounded by the cylindrical belt and contacting an inner peripheral surface of the cylindrical belt; and a support member within the interior region, the support member contacting and supporting the heat generating member, wherein the heat generating member comprises:

a curved portion contacting the inner peripheral surface of the cylindrical belt; and a bent portion bent inwardly away from the inner peripheral surface from an end of the curved portion, the bent portion being directly supported by the support member and having an outer surface facing away from the curved portion, and the bent portion includes an annular portion into which a swing shaft can be inserted.

2. The heating device according to claim 1, further comprising:

a shielding member in the interior region and connected to the heat generating member, wherein the heat generating member is formed of a magnetic material, and the shielding member is formed of a non-magnetic material.

3. The heating device according to claim 2, wherein the shielding member is not directly supported by the support member.

4. The heating device according to claim 1, wherein the curved portion is formed in a circular arc shape, and an arc center of the curved portion is in the same plane as the outer surface of the bent portion.

5. The heating device according to claim 1, wherein the end of the curved portion is in the same plane as the outer surface of the bent portion.

6. The heating device according to claim 1, wherein the curved portion is formed in a circular arc shape, and an arc center of the curved portion is in a different plane from the outer surface of the bent portion.

7. The heating device according to claim 1, wherein a radius of curvature of the curved portion is less than that of the cylindrical belt.

8. The heating device according to claim 1, wherein the curved portion contacts the inner surface of the cylindrical belt.

9. The heating device according to claim 1, wherein the bent portion comprises a hole through which at least part of the support member can be inserted.

10. The heating device according to claim 1, wherein the support member is fixed to a frame inside the interior region surrounded by the cylindrical belt.

11. The heating device according to claim 10, wherein the support member comprises a first main body and a second main body, the first main body comprises a first support tip, the second main body comprises a second support tip, the first and second main bodies are fixed to the frame, and the first and second support tips contact the heat generating member.

12. The heating device according to claim 10, wherein the support member comprises a first main body, the first main body includes a first support tip, the first main body is fixed to the frame, and the first support tip contacts the heat generating member.

13. The heating device according to claim 1, wherein the support member directly supports the heat generating member, and the support member includes a slit configured to permit a portion of the bent portion to be inserted therein.

14. A heating device, comprising:
a cylindrical belt;
a heat generating member disposed within an interior region surrounded by the cylindrical belt and contacting an inner peripheral surface of the cylindrical belt;
a support member within the interior region, the support member contacting and supporting the heat generating member and being fixed to a frame inside the interior region surrounded by the cylindrical belt; and
a shielding member in the interior region and connected to the heat generating member, wherein
the heat generating member is formed of a magnetic material,
the shielding member is formed of a non-magnetic material,
the support member comprises a first main body and a second main body,
the first main body comprises a first support tip,
the second main body comprises a second support tip,
the first and second main bodies are fixed to the frame,
the first and second support tips contact the heat generating member, and
the shielding member does not directly contact the support member.

15. A heating device, comprising:
a cylindrical belt;
a heat generating member disposed within an interior region surrounded by the cylindrical belt and contacting an inner peripheral surface of the cylindrical belt; and
a support member within the interior region, the support member contacting and supporting the heat generating member, wherein
the heat generating member comprises:
a curved portion contacting the inner peripheral surface of the cylindrical belt; and
a bent portion bent inwardly away from the inner peripheral surface from an end of the curved portion, the bent portion being directly supported by the support member and having an outer surface facing away from the curved portion, and
the bent portion comprises a hole through which at least part of the support member can be inserted.

16. The heating device according to claim 15, wherein the support member is fixed to a frame inside the interior region surrounded by the cylindrical belt.

17. The heating device according to claim 16, wherein
the support member comprises a first main body,
the first main body includes a first support tip,
the first main body is fixed to the frame, and
the first support tip contacts the heat generating member.

18. The heating device according to claim 15, wherein the end of the curved portion is in the same plane as the outer surface of the bent portion.

19. The heating device according to claim 15, wherein
the curved portion is formed in a circular arc shape, and
an arc center of the curved portion is in a different plane from the outer surface of the bent portion.

20. The heating device according to claim 15, wherein a radius of curvature of the curved portion is less than that of the cylindrical belt.

* * * * *